(12) United States Patent
Hsu et al.

(10) Patent No.: US 12,301,268 B2
(45) Date of Patent: May 13, 2025

(54) SIGNAL PREDISTORTION CIRCUIT CONFIGURATION

(71) Applicant: REALTEK SEMICONDUCTOR CORPORATION, Hsinchu (TW)

(72) Inventors: Ming-Chun Hsu, Hsinchu (TW); Chin-Chun Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 7 days.

(21) Appl. No.: 18/537,856

(22) Filed: Dec. 13, 2023

(65) Prior Publication Data

US 2024/0214015 A1    Jun. 27, 2024

(30) Foreign Application Priority Data

Dec. 22, 2022   (TW) .................................. 111149559

(51) Int. Cl.
*H04B 1/04*   (2006.01)
(52) U.S. Cl.
CPC .................................. *H04B 1/0475* (2013.01)
(58) Field of Classification Search
CPC ...................... H04B 1/0475; H04B 2001/0425
USPC ......................................... 375/219, 267, 299
See application file for complete search history.

(56) References Cited

U.S. PATENT DOCUMENTS

| | | | |
|---|---|---|---|
| 9,813,085 B1 | 11/2017 | Butler et al. | |
| 11,705,928 B2 * | 7/2023 | Wang | H04B 1/0475 375/296 |
| 12,177,169 B2 * | 12/2024 | Yuan | H04L 25/03012 |
| 2014/0024325 A1 | 1/2014 | Iun et al. | |
| 2014/0198831 A1 * | 7/2014 | Ou | H04B 1/0475 375/219 |
| 2016/0099732 A1 * | 4/2016 | Petrovic | H03F 1/0222 375/297 |
| 2020/0195280 A1 * | 6/2020 | Burra | H04B 1/48 |
| 2020/0366254 A1 * | 11/2020 | Seo | H04L 27/01 |
| 2022/0190870 A1 * | 6/2022 | Liu | H04B 1/401 |
| 2022/0286152 A1 | 9/2022 | Wang et al. | |
| 2023/0261374 A1 * | 8/2023 | De Maaijer | H04B 7/10 |
| 2024/0137054 A1 * | 4/2024 | Peng | H04B 1/0475 |

* cited by examiner

*Primary Examiner* — Emmanuel Bayard (74) *Attorney, Agent, or Firm* — WPAT, PC (57) ABSTRACT

A signal predistortion circuit configuration includes a digital predistortion (DPD) circuit, a first transceiver, and a second transceiver, and can reduce the influence of poor signal path insulation when performing a DPD training. During the DPD training, the DPD circuit transmits a training signal through a first signal path to adjust first predistortion parameters, and transmits a training signal through a second signal path to adjust second predistortion parameters. The first signal path includes: a transmitting circuit and an analog-front-end circuit of the first transceiver, a receiving analog circuit and a switch circuit of the second transceiver, and a switch circuit and an analog-to-digital converter (ADC) of the first transceiver. The second signal path includes: a transmitting circuit and an analog-front-end circuit of the second transceiver, a receiving analog circuit and the switch circuit of the first transceiver, and the switch circuit and an ADC of the second transceiver.

8 Claims, 7 Drawing Sheets

SIGNAL PREDISTORTION CIRCUIT CONFIGURATION

BACKGROUND OF THE INVENTION

1. Field of the Invention

The present disclosure relates to a circuit configuration, especially to a signal predistortion circuit configuration.

2. Description of Related Art

Figure 1:
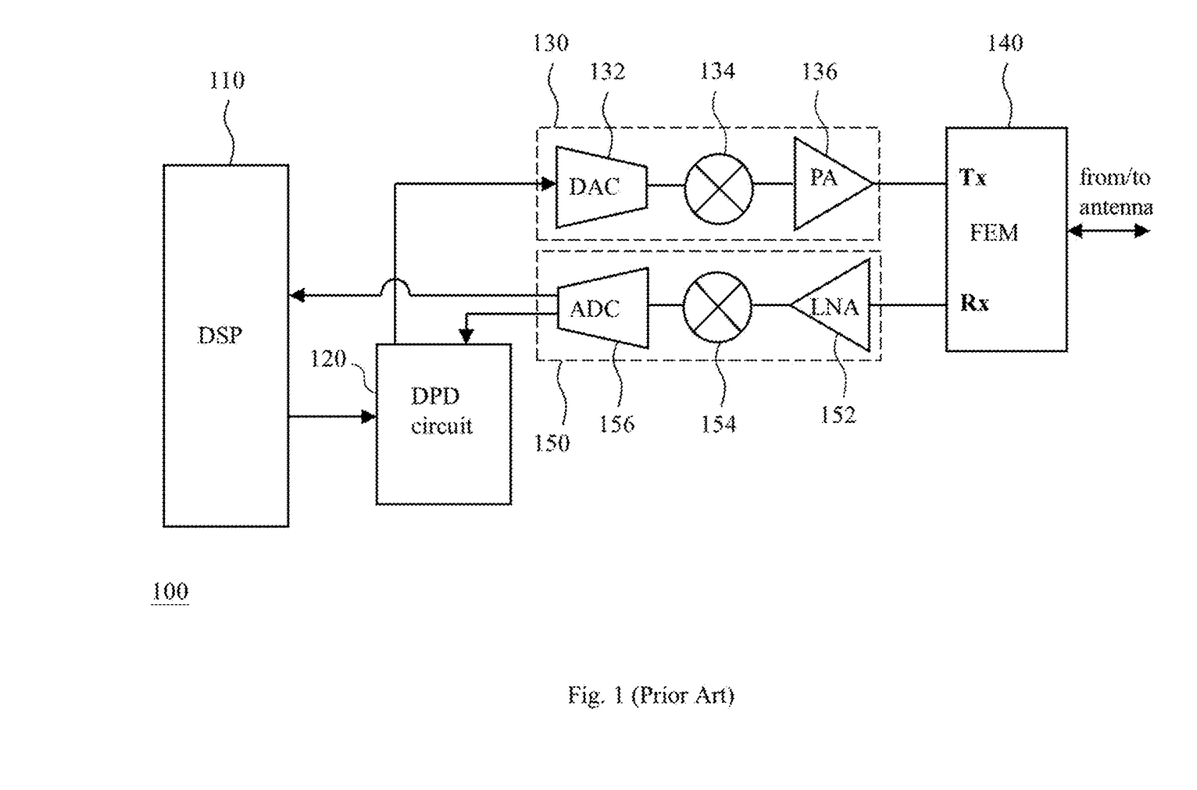
FIG. 1 shows a conventional configuration of a wireless communication circuit.

Generally, a digital predistortion (DPD) circuit is used for cancelling the non-linear influence of an analog circuit (e.g., a power amplifier). For example, FIG. 1 shows a conventional wireless communication circuit configuration 100 including a digital signal processor (DSP) 110, a DPD circuit 120, a transmitting-end (TX) path 130, a front-end modulator (FEM) 140, and a receiving-end (RX) path 150, wherein the TX path 130 includes a digital-to-analog converter (DAC) 132, an upconverter 134, and a power amplifier (PA) 136, the RX path 150 includes a lower noise amplifier (LNA) 152, a downconverter 154, and an analog-to-digital converter (ADC) 156, and the FEM 140 transmits/receives signals through an antenna in a communication mode. When determining digital predistortion parameters, the DPD circuit 120 generates a predistortion signal according to a predetermined signal (e.g., a signal with a predetermined pattern) and the default setting of the digital predistortion parameters, then the predistortion signal is transmitted through the TX path 130, the TX terminal (Tx) and the RX terminal (Rx) of the FEM 140, and the RX path 150 and finally returns to the DPD circuit 120, and then the DPD circuit 120 adjusts the digital predistortion parameters according to the difference between the returned predistortion signal and the predetermined signal, wherein the predetermined signal can be generated by the DPD circuit 120 itself or can come from the DSP 110. However, in order to optimize the circuit area, the distance between the TX path 130 and the RX path 150 is usually very short, and this cannot sufficiently insulate the TX path 130 from the RX path 150. In light of the above, the signal coupling between the TX path 130 from the RX path 150 is serious, and this prevents the DPD circuit 120 from properly determining the digital predistortion parameters.

Figure 2:
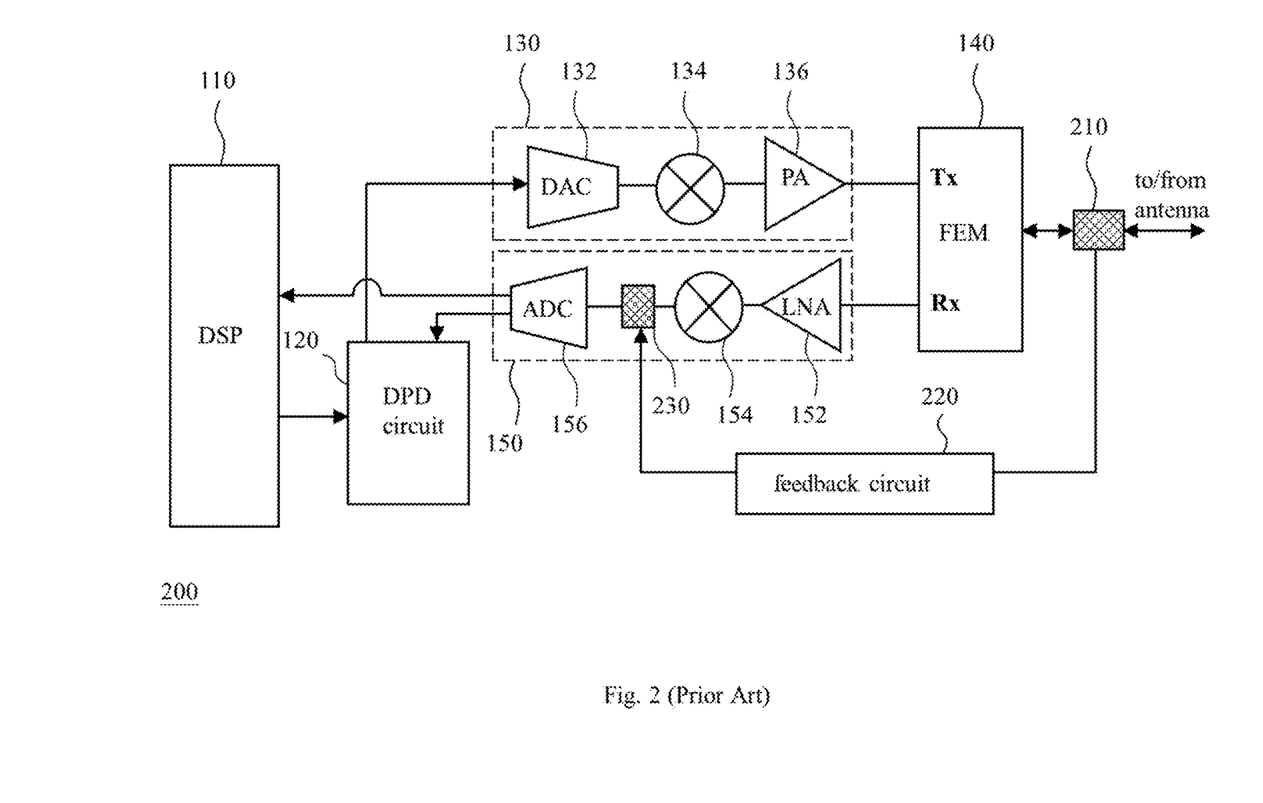
FIG. 2 shows another conventional configuration of a wireless communication circuit.

In order to prevent the aforementioned problem, a general solution is to set an additional reception path as shown in FIG. 2. In comparison with FIG. 1, the wireless communication circuit configuration 200 in FIG. 2 further includes a coupler 210, a feedback circuit 220, and a switch 230. The feedback circuit 220 can be a circuit similar/equivalent to the LNA 152 and the downconverter 154. When determining digital predistortion parameters, the DPD circuit 120 generates a predistortion signal according to a predetermined signal and the default setting of the digital predistortion parameters, then the predistortion signal is transmitted through the TX path 130, the TX terminal (Tx) of the FEM 140, the coupler 210, the feedback circuit 220, the switch 230, and the ADC 156 and finally returns to the DPD circuit 120, and then the DPD circuit 120 adjusts the digital predistortion parameters according to the difference between the returned predistortion signal and the predetermined signal. Since the distance between the feedback circuit 220 and the TX path 130 is longer than the distance between the RX path 150 and the TX path 130, the configuration of FIG. 2 can prevent serious signal coupling between the TX path 130 from the RX path 150 when training the digital predistortion parameters. However, the setting of the coupler 210, the feedback circuit 220, and the switch 230 requires additional pins and circuit areas, and this leads to a higher cost.

Another solution is to lower the requirements for a signal to interference ratio (SIR) in the configuration of FIG. 1 and thereby lower the requirements for the insulation between the TX path 130 and the RX path 150. However, this solution needs a high-end noise reduction algorithm and an advanced circuit design capability, and leads to a high cost and a lot of design difficulties.

SUMMARY OF THE INVENTION

An object of the present disclosure is to provide a signal predistortion circuit configuration as an improvement on the prior art.

A first embodiment of the signal predistortion circuit configuration of the present disclosure includes a digital predistortion (DPD) circuit, a first transceiver circuit, and a second transceiver circuit.

Regarding the first embodiment, the DPD circuit is configured to output a first digital transmission signal according to at least one first predistortion parameter and output a second digital transmission signal according to at least one second predistortion parameter. The DPD circuit is further configured to determine whether to adjust the at least one first predistortion parameter according to a first digital reception signal and determine whether to adjust the at least one second predistortion parameter according to a second digital reception signal.

Regarding the first embodiment, the first transceiver circuit includes a first transmitting circuit, a first analog-front-end (AFE) circuit, a first receiving-end (RX) analog circuit, a first RX switch circuit, and a first analog-to-digital converter (ADC). The first transmitting circuit is coupled with the DPD circuit, and is configured to output a first analog transmission signal according to the first digital transmission signal. The first AFE circuit is coupled with the first transmitting circuit, and is configured to generate a first analog reception signal according to the first analog transmission signal. The first RX analog circuit is coupled with a second AFE circuit, and is configured to output a second analog signal to the first RX switch circuit according to a second analog reception signal. The first RX switch circuit is coupled with the first RX analog circuit, the first ADC, and a second RX switch circuit, and is configured to forward the second analog signal from the first RX analog circuit to the second RX switch circuit and forward a first analog signal from the second RX switch circuit to the first ADC. The first ADC is coupled with the first RX switch circuit and the DPD circuit, and is configured to convert the first analog signal into the first digital reception signal for the DPD circuit.

Regarding the first embodiment, the second transceiver circuit includes a second transmitting circuit, the second AFE circuit, a second RX analog circuit, the second RX switch circuit, and a second ADC. The second transmitting circuit is coupled with the DPD circuit, and is configured to output a second analog transmission signal according to the second digital transmission signal. The second AFE circuit is coupled with the second transmitting circuit, and is configured to generate the second analog reception signal according to the second analog transmission signal. The second RX analog circuit is coupled with the first AFE circuit, and is configured to output the first analog signal to the second RX switch circuit according to the first analog reception signal. The second RX switch circuit is coupled with the second RX analog circuit, the second ADC, and the first RX switch circuit, and is configured to forward the first analog signal from the second RX analog circuit to the first RX switch circuit and forward the second analog signal from the first RX switch circuit to the second ADC. The second ADC is coupled with the second RX switch circuit and the DPD circuit, and is configured to convert the second analog signal into the second digital reception signal for the DPD circuit. It is noted that the minimum distance between the first transmitting circuit and the first RX analog circuit is shorter than the minimum distance between the first transmitting circuit and the second RX analog circuit, and the minimum distance between the second transmitting circuit and the second RX analog circuit is shorter than the minimum distance between the second transmitting circuit and the first RX analog circuit.

A second embodiment of the signal predistortion circuit configuration of the present disclosure includes a DPD circuit, a first transceiver circuit, and a second transceiver circuit.

Regarding the second embodiment, the DPD circuit is configured to output a first digital transmission signal according to at least one first predistortion parameter and output a second digital transmission signal according to at least one second predistortion parameter. The DPD circuit is further configured to determine whether to adjust the at least one first predistortion parameter according to a first digital reception signal and determine whether to adjust the at least one second predistortion parameter according to a second digital reception signal.

Regarding the second embodiment, the first transceiver circuit includes a first transmitting circuit, a first AFE circuit, a first wiring, a first RX switch circuit, and a first ADC. The first transmitting circuit is coupled with the DPD circuit, and is configured to output a first analog transmission signal according to the first digital transmission signal. The first AFE circuit is coupled with the first transmitting circuit, and is configured to generate a first analog reception signal according to the first analog transmission signal. The first wiring is coupled with a second AFE circuit, and is configured to transmit a second analog reception signal to the first RX switch circuit. The first RX switch circuit is coupled with the first wiring, the first ADC, and a second RX switch circuit, and is configured to forward the second analog signal from the first wiring to the second RX switch circuit and forward the first analog reception signal from the second RX switch circuit to the first ADC. The first ADC is coupled with the first RX switch circuit and the DPD circuit, and is configured to convert the first analog reception signal into the first digital reception signal for the DPD circuit.

Regarding the second embodiment, the second transceiver circuit includes a second transmitting circuit, a second AFE circuit, a second wiring, a second RX switch circuit, and a second ADC. The second transmitting circuit is coupled with the DPD circuit, and is configured to output a second analog transmission signal according to the second digital transmission signal. The second AFE circuit is coupled with the second transmitting circuit, and is configured to generate the second analog reception signal according to the second analog transmission signal. The second wiring is coupled with the first AFE circuit, and is configured to transmit the first analog reception signal to the second RX switch circuit. The second RX switch circuit is coupled with the second wiring, the second ADC, and the first RX switch circuit, and is configured to forward the first analog signal from the second wiring to the first RX switch circuit and forward the second analog reception signal from the first RX switch circuit to the second ADC. The second ADC is coupled with the second RX switch circuit and the DPD circuit, and is configured to convert the second analog reception signal into the second digital reception signal for the DPD circuit. It is noted that the minimum distance between the first transmitting circuit and the first wiring is shorter than the minimum distance between the first transmitting circuit and the second wiring, and the minimum distance between the second transmitting circuit and the second wiring is shorter than the minimum distance between the second transmitting circuit and the first wiring.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The specification discloses a signal predistortion circuit configuration. The signal predistortion circuit configuration improves the insulation between a transmitting-end (TX) path and a receiving-end (RX) path at a very low cost when performing a digital predistortion (DPD) training process, and thereby improves the effect of DPD.

Figure 3:
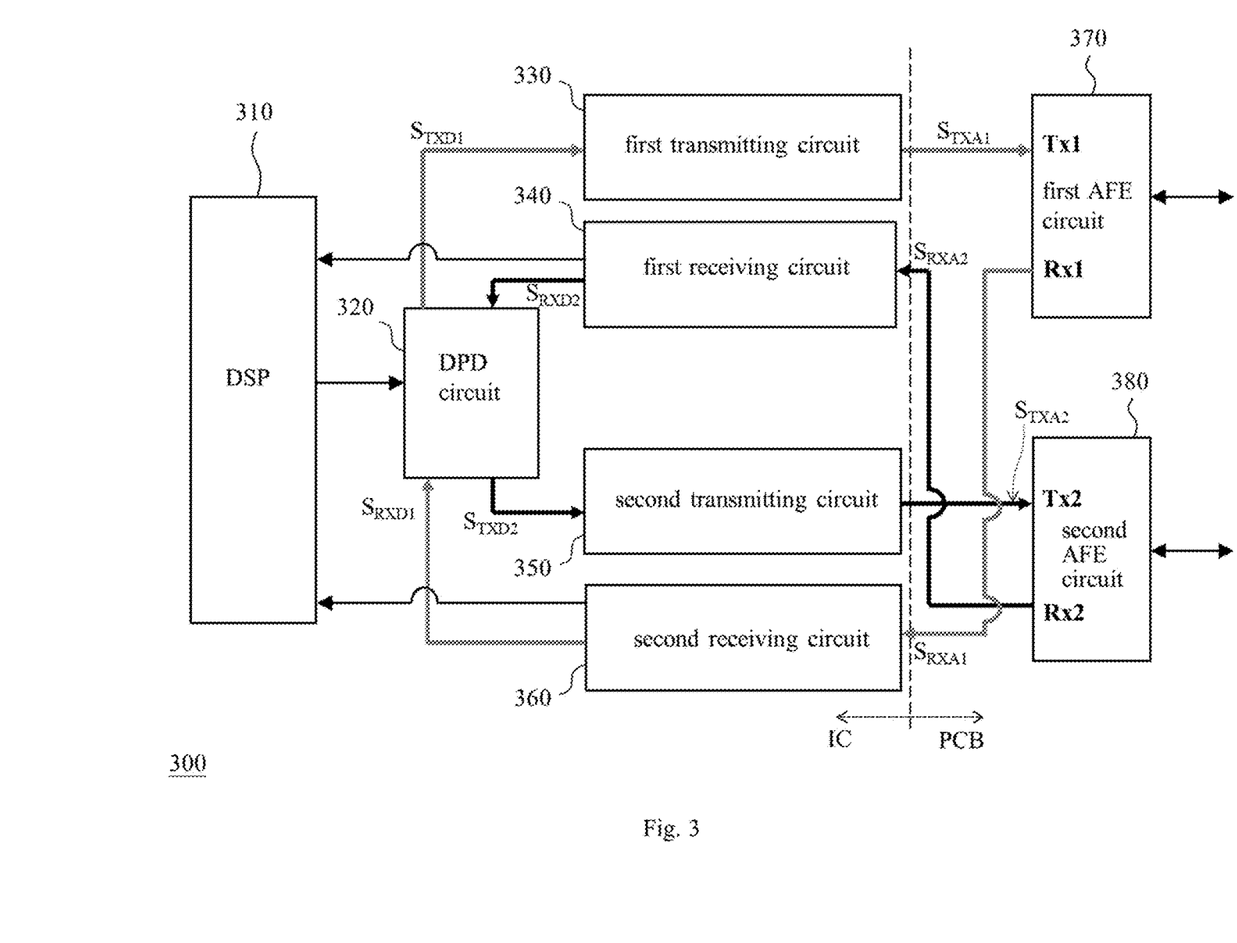
FIG. 3 shows an embodiment of the signal predistortion circuit configuration of the present disclosure.

FIG. 3 shows an embodiment of the signal predistortion circuit configuration of the present disclosure. The signal predistortion circuit configuration 300 of FIG. 3 includes a digital signal processor (DSP) 310, a DPD circuit 320, a first transmitting circuit 330, a first receiving circuit 340, a second transmitting circuit 350, a second receiving circuit 360, a first analog-front-end (AFE) circuit 370, and a second AFE circuit 380. The whole function of the first transmitting circuit 330, the first receiving circuit 340, and the first AFE circuit 370 (i.e., the whole function of a first transceiver circuit) is similar/equivalent to the whole function of the second transmitting circuit 350, the second receiving circuit 360, and the second AFE circuit 380 (i.e., the whole function of a second transceiver circuit).

Please refer to FIG. 3. In an exemplary implementation, the signal predistortion circuit configuration 300 is applied to a multi-input multi-output (MIMO) wireless communication device (not shown in FIG. 3). In this implementation, the first transmitting circuit 330 includes a first radio-frequency (RF) transmitting circuit (not shown in FIG. 3); the first AFE circuit 370 is included in a first front-end modulator (FEM) (not shown in FIG. 3), and the first AFE circuit 370 is configured to transmit a signal from a first TX terminal (Tx1) to a first RX terminal (Rx1) in a training mode and configured to transmit/receive a signal through an antenna in a communication mode; and the first receiving circuit 340 includes a first RF receiving circuit (not shown in FIG. 3). In addition, the second transmitting circuit 350 includes a second RF transmitting circuit (not shown in FIG. 3); the second AFE circuit 380 is included in a second FEM (not shown in FIG. 3), and the second AFE circuit 380 is configured to transmit a signal from a second TX terminal (Tx2) to a second RX terminal (Rx2) in the training mode and configured to transmit/receive a signal through an antenna in the communication mode; and the second receiving circuit 360 includes a second RF receiving circuit (not shown in the figures). Furthermore, both the DSP circuit 310 and the DPD circuit 320 are included in a digital baseband circuit (not shown in FIG. 3). The above-mentioned circuits not shown in FIG. 3 are well known in this technical field and fall beyond the scope of the present discussion, and their details are omitted here.

Please refer to FIG. 3. In another exemplary implementation, the signal predistortion circuit configuration 300 is applied to an audio device (not shown in FIG. 3). In this implementation, the first transmitting circuit 330 includes a first digital-to-analog converter (DAC) (not shown in FIG. 3); the first AFE circuit 370 includes a first amplifier (not shown in FIG. 3), and the first AFE circuit 370 is configured to transmit a signal from the Tx1 to the Rx1 in a training mode and configured to transmit/receive a signal to/from an external device (e.g., a speaker or earphone) in a playback mode; and the first receiving circuit 340 includes a first analog-to-digital converter (ADC) (not shown in FIG. 3). In addition, the second transmitting circuit 350 includes a second DAC (not shown in FIG. 3); the second AFE circuit 380 includes a second amplifier (not shown in FIG. 3), and the second AFE circuit 380 is configured to transmit a signal from the Tx2 to the Rx2 in the training mode and configured to transmit/receive a signal to/from the external device in the playback mode; and the second receiving circuit 360 includes a second ADC (not shown in FIG. 3). Furthermore, both the DSP circuit and the DPD circuit 320 are included in a digital audio circuit (not shown in FIG. 3). The above-mentioned circuits not shown in FIG. 3 are well known in this technical field and fall beyond the scope of the present discussion, and their details are omitted here.

Please refer to FIG. 3. The first transmitting circuit 330 is set next to the first receiving circuit 340, and the insulation between the two circuits is probably insufficient. The second transmitting circuit 350 is set next to the second receiving circuit 360, and the insulation between the two circuits is probably insufficient. In order to prevent the signal coupling caused by the insufficient insulation from affecting the effect of DPD, the signal predistortion circuit configuration 300 uses the first transmitting circuit 330, the first AFE circuit 370, and the second receiving circuit 360 as a signal loop for a first DPD training process, and uses the second transmitting circuit 350, the second AFE circuit 380, and the first receiving circuit 340 as a signal loop for a second DPD training process. Since the minimum distance between the first transmitting circuit 330 and the second receiving circuit 360 is much greater than the minimum distance between the first transmitting circuit 330 and the first receiving circuit 340, the insulation between the first transmitting circuit 330 and the second receiving circuit 360 is relatively better, and consequently the influence of the signal coupling on the effect of DPD is reduced. Similarly, since the minimum distance between the second transmitting circuit 350 and the first receiving circuit 340 is much greater than the minimum distance between the second transmitting circuit 350 and the second receiving circuit 360, the insulation between the second transmitting circuit 350 and the first receiving circuit 340 is relatively better, and consequently the influence of the signal coupling on the effect of DPD is reduced.

Please refer to FIG. 3. When performing the first DPD training process, the DPD circuit 320 processes (e.g., distorts) a first original signal according to at least one first predistortion parameter and thereby outputs a first digital transmission signal ($S_{TXD1}$). Afterward, the first digital transmission signal is transmitted through the first transmitting circuit 330, the Tx1 of the first AFE circuit 370, the Rx1 of the first AFE circuit 370, and the second receiving circuit 360 and finally returns to the DPD circuit 320; accordingly, the DPD circuit 320 can determine whether to adjust the at least one first predistortion parameter according to the difference between the returned signal (i.e., the first digital reception signal ($S_{RXD1}$)) and the first original signal and thereby minimize the difference or ensure that the difference is small enough to fulfill the effect of DPD. In an exemplary implementation, the first original signal is generated by the DPD circuit 320 itself; in another exemplary implementation, the first original signal is generated by the DSP 310. It is noted that the first digital reception signal ($S_{RXD1}$) is under a first non-linear influence of the first transmitting circuit 330, the first AFE circuit 370, and the second receiving circuit 360. The digital predistortion circuit 320 adjusts the at least one first predistortion parameter to reduce/eliminate the first non-linear influence.

Please refer to FIG. 3. When performing the second DPD training process, the DPD circuit 320 processes (e.g., distorts) a second original signal according to at least one second predistortion parameter and thereby outputs a second digital transmission signal ($S_{TXD2}$). Afterward, the second digital transmission signal is transmitted through the second transmitting circuit 350, the Tx2 of the second AFE circuit 380, the Rx2 of the second AFE circuit 380, and the first receiving circuit 340 and finally returns to the DPD circuit 320; accordingly, the DPD circuit 320 can determine whether to adjust the at least one second predistortion parameter according to the difference between the returned signal (i.e., the second digital reception signal ($S_{RXD2}$)) and the second original signal and thereby minimize the difference or ensure that the difference is small enough to fulfill the effect of DPD. In an exemplary implementation, the second original signal is generated by the DPD circuit 320 itself; in another exemplary implementation, the second original signal is generated by the DSP 310. It is noted that the second digital reception signal ($S_{RXD2}$) is under a second non-linear influence of the second transmitting circuit 350, the second AFE circuit 380, and the first receiving circuit 340. The digital predistortion circuit 320 adjusts the at least one second predistortion parameter to reduce/eliminate the second non-linear influence.

On the basis of the above description, the first transmitting circuit 330 is configured to generate a first analog transmission signal ($S_{TXA1}$) according to the first digital transmission signal ($S_{TXD1}$), and the first receiving circuit 340 is configured to generate the second digital reception signal ($S_{RXD2}$) according to a second analog reception signal ($S_{RXA2}$) and then transmit the second digital reception signal to the DPD circuit 320. In addition, the second transmitting circuit 350 is configured to generate a second analog transmission signal ($S_{TXA2}$) according to the second digital transmission signal ($S_{TXD2}$), and the second receiving circuit 360 is configured to generate the first digital reception signal ($S_{RXD1}$) according to a first analog reception signal ($S_{RXA1}$)

and then transmit the first digital reception signal to the DPD circuit 320. The first AFE circuit 370 is coupled between the first transmitting circuit 330 and the second receiving circuit 360, and configured to generate the first analog reception signal ($S_{RXA1}$) according to the first analog transmission signal ($S_{TXA1}$). The second AFE circuit 380 is coupled between the second transmitting circuit 350 and the first receiving circuit 340, and configured to generate the second analog reception signal ($S_{RXA2}$) according to the second analog transmission signal ($S_{TXA2}$).

In an exemplary implementation, all of the first transmitting circuit 330, the first receiving circuit 340, the second transmitting circuit 350, and the second receiving circuit 360 are included in an integrated circuit (i.e., the label "IC" in FIG. 3) while the DPD circuit 320 can be included in the same integrated circuit or in another integrated circuit. In addition, the first AFE circuit 370 and the second AFE circuit 380 are set in a circuit board (e.g., a printed circuit board) (i.e., the label "PCB" in FIG. 3), and they are not included in the above-mentioned integrated circuit. The first AFE circuit 370 is coupled to the second receiving circuit 360 through a first trace of the circuit board and a first connection interface (e.g., a pin or a solder ball) (not shown in the figures). The second AFE circuit 380 is coupled to the first receiving circuit 340 through a second trace of the circuit board and a second connection interface (e.g., a pin or a solder ball) (not shown in the figures).

Figure 4:
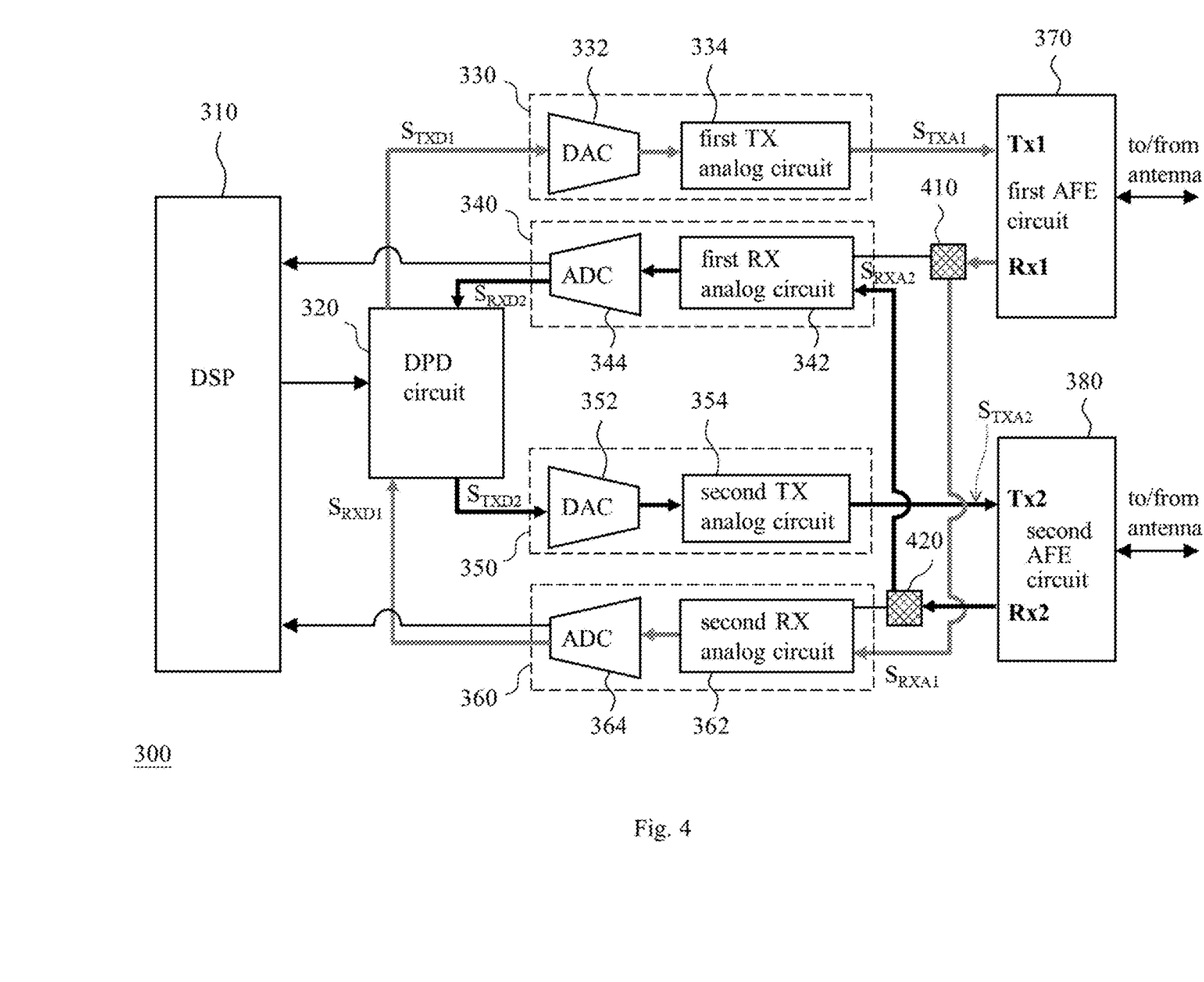
FIG. 4 shows an embodiment of the first transmitting circuit, the first receiving circuit, the second transmitting circuit, and the second receiving circuit of FIG. 3.

FIG. 4 shows an embodiment of the first transmitting circuit 330, the first receiving circuit 340, the second transmitting circuit 350, and the second receiving circuit 360. The first transmitting circuit 330 includes a first DAC 332 and a first TX analog circuit 334 (e.g., a circuit including an upconverter and a power amplifier as shown in FIGS. 1-2, wherein the power amplifier usually has a non-linear characteristic). The first DAC 332 is configured to generate a first conversion signal according to the first digital transmission signal ($S_{TXD1}$). The first TX analog circuit 334 is configured to generate the first analog transmission signal ($S_{TXA1}$) according to the first conversion signal. The first receiving circuit 340 includes a first RX analog circuit 342 (e.g., a circuit including a low noise amplifier and a downconverter as shown in FIGS. 1-2) and a first ADC 344. The first RX analog circuit 342 is configured to generate a second to-be-converted signal according to the second analog reception signal ($S_{RXA2}$). The first ADC 344 is configured to generate the second digital reception signal ($S_{RXD2}$) according to the second to-be-converted signal. Similarly, the second transmitting circuit 350 includes a second DAC 352 and a second TX analog circuit 354 (e.g., a circuit including an upconverter and a power amplifier as shown in FIGS. 1-2, wherein the power amplifier usually has a non-linear characteristic). The second DAC 352 is configured to generate a second conversion signal according to the second digital transmission signal ($S_{TXD2}$). The second TX analog circuit 354 is configured to generate the second analog transmission signal ($S_{TXA2}$) according to the second conversion signal. The second receiving circuit 360 includes a second RX analog circuit 362 (e.g., a circuit including a low noise amplifier and a downconverter as shown in FIGS. 1-2) and a second ADC 364. The second RX analog circuit 362 is configured to generate a first to-be-converted signal according to the first analog reception signal ($S_{RXA1}$). The second ADC 364 is configured to generate the first digital reception signal ($S_{RXD1}$) according to the first to-be-converted signal.

Please refer to FIG. 4. In an exemplary implementation, the signal predistortion circuit configuration 300 is applied to a wireless communication device and further includes a first switch circuit 410 and a second switch circuit 420. The first switch circuit 410 couples the first AFE circuit 370 with the second receiving circuit 360 in a training mode, and couples the first AFE circuit 370 with the first receiving circuit 340 in a communication mode. The second switch circuit 420 couples the second AFE circuit 380 with the first receiving circuit 340 in the training mode, and couples the second AFE circuit 380 with the second receiving circuit 360 in the communication mode. The DSP 410 is configured to receive a first communication signal through the first AFE circuit 370, the first switch circuit 410, and the first receiving circuit 340 and process the first communication signal in the communication mode. The DSP 410 is further configured to receive a second communication signal through the second AFE circuit 380, the second switch circuit 420, and the second receiving circuit 360 and process the second communication signal in the communication mode. The first communication signal is originated from a first external wireless device (not shown in the figures), and the second communication signal is originated from the first external wireless device or a second external wireless device (not shown in the figures). The first/second external wireless device wirelessly communicates with the wireless communication device to which the signal predistortion circuit configuration 300 is applied. To sum up, the signal reception path in the training mode is different from the signal reception path in the communication mode.

Please refer to FIG. 4. The first digital reception signal ($S_{RXD1}$) is under a first non-linear influence of the first transmitting circuit 330, the first AFE circuit 370, and the second receiving circuit 360. The second digital reception signal ($S_{RXD2}$) is under a second non-linear influence of the second transmitting circuit 350, the second AFE circuit 380, and the first receiving circuit 340. In an exemplary implementation, the contribution made by the second receiving circuit 360 to the first non-linear influence is similar to the contribution made by the first receiving circuit 340 to the second non-linear influence; for example, the difference between the two contributions is lower than −10 decibel (dB). This small difference ensures that the parameter(s) determined in the training mode is applicable to the operation in the communication mode. In another exemplary implementation, the contribution made by the second receiving circuit 360 to the first non-linear influence is much lower than the contribution made by the first transmitting circuit 330 and the first AFE circuit 370 to the first non-linear influence; for example, the difference between the two contributions is greater than 10 dB. In addition, the contribution made by the first receiving circuit 340 to the second non-linear influence is much lower than the contribution made by the second transmitting circuit 350 and the second AFE circuit 380 to the second non-linear influence; for example, the difference between the two contributions is greater than 10 dB. In brief, in this implementation the contribution made by the transmitting circuit and the AFE circuit is dominant, and the contribution made by the receiving circuit is insignificant.

Please refer to FIG. 3 and the description of FIGS. 3-4. In an exemplary implementation, the signal reception path in the training mode is the same as the signal reception path in the communication mode; accordingly, the switch circuits (e.g., the first switch circuit 410 and the second switch circuit 420 of FIG. 4) operating according to the change of modes are not necessary, and the DSP 310 is configured to receive and process the first communication signal through the first AFE circuit 370 and the second receiving circuit 360 in the communication mode and further configured to receive and process the second communication signal through the second AFE circuit 380 and the first receiving circuit 340 in the communication mode. Since those having ordinary skill in the art can appreciate the detail and modification of the above implementation according to the embodiments and the exemplary implementations described in the preceding paragraphs, repeated and redundant description is omitted here.

It is noted that in the communication mode the DPD circuit 320 can leave the at least one first predistortion parameter unchanged and/or leave the at least one second predistortion parameter unchanged; or in the communication mode the DPD circuit 320 can determine whether to adjust the at least one first predistortion parameter according to the first wireless communication signal, and/or determine whether to adjust the at least one second predistortion parameter according to the second wireless communication signal.

Figure 5:
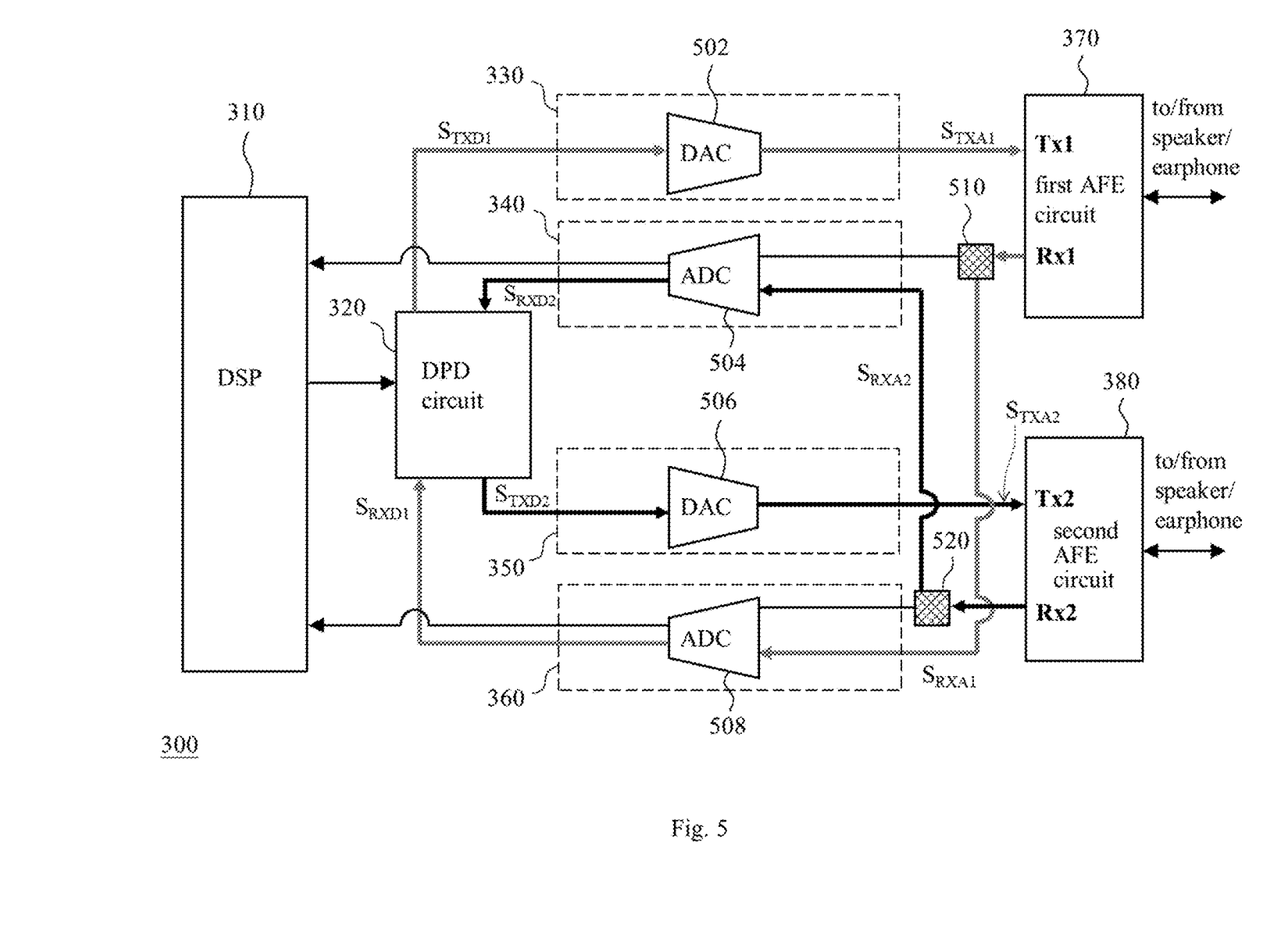
FIG. 5 shows another embodiment of the first transmitting circuit, the first receiving circuit, the second transmitting circuit, and the second receiving circuit of FIG. 3.

FIG. 5 shows another embodiment of the first transmitting circuit 330, the first receiving circuit 340, the second transmitting circuit 350, and the second receiving circuit 360. The first transmitting circuit 330 includes a first DAC 502 that is configured to generate the first analog transmission signal ($S_{TXA1}$) according to the first digital transmission signal ($S_{TXD1}$). The first receiving circuit 340 includes a first ADC 504 that is configured to generate the second digital reception signal ($S_{RXD2}$) according to the second analog reception signal ($S_{RXA2}$). The second transmitting circuit 350 includes a second DAC 506 that is configured to generate the second analog transmission signal ($S_{TXA2}$) according to the second digital transmission signal ($S_{TXD2}$). The second receiving circuit 360 includes a second ADC 508 that is configured to generate the first digital reception signal ($S_{RXD1}$) according to the first analog reception signal ($S_{RXA1}$).

Please refer to FIG. 5. In an exemplary implementation, the signal predistortion circuit configuration 300 is applied to an audio device and further includes a first mode switch circuit 510 and a second mode switch circuit 520. The first mode switch circuit 510 couples the first AFE circuit 370 with the second receiving circuit 360 in a training mode, and couples the first AFE circuit 370 with the first receiving circuit 340 in a playback mode. The second mode switch circuit 520 couples the second AFE circuit 380 with the first receiving circuit 340 in the training mode, and couples the second AFE circuit 380 with the second receiving circuit 360 in the playback mode. The DSP 410 is configured to receive and process a first audio signal (e.g., a first audio control signal from a speaker/earphone) through the first AFE circuit 370, the first mode switch circuit 510, and the first receiving circuit 340 in the playback mode. The DSP 410 is further configured to receive and process a second audio signal (e.g., a second audio control signal from a speaker/earphone) through the second AFE circuit 380, the second mode switch circuit 520, and the second receiving circuit 360 in the playback mode. In brief, the signal reception path in the training mode is different from the signal reception path in the playback mode. It is noted that the limitations on the contributions made by the circuits to the first non-linear influence and the second non-linear influence described in the preceding paragraph are applicable to the above implementation. It is also noted that in the playback mode the DPD circuit 320 can leave the at least one first predistortion parameter unchanged and/or leave the at least one second predistortion parameter unchanged; or in the playback mode the DPD circuit 320 can determine whether to adjust the at least one first predistortion parameter according to the first audio signal, and/or determine whether to adjust the at least one second predistortion parameter according to the second audio signal.

Please refer to FIG. 3 and the descriptions of FIG. 3 and FIG. 5. In an exemplary implementation, the signal reception path in the training mode is the same as the signal reception path in the playback mode; accordingly, the switch circuits (e.g., the first mode switch circuit 510 and the second mode switch circuit 520 of FIG. 5) operating according to the change of modes are not necessary, and the DSP 310 is configured to receive and process the first audio signal through the first AFE circuit 370 and the second receiving circuit 360 in the playback mode and further configured to receive and process the second audio signal through the second AFE circuit 380 and the first receiving circuit 340 in the playback mode. Since those having ordinary skill in the art can appreciate the detail and modification of the above implementation according to the embodiments and the exemplary implementations described in the preceding paragraphs, repeated and redundant description is omitted here.

The embodiment of FIG. 3 has a problem. In the training mode, the embodiment of FIG. 3 uses "the first transmitting circuit 330 and the first AFE circuit 370 of the first transceiver circuit" and "the second receiving circuit 360 of the second transceiver circuit" as the signal loop (i.e., the gray transmission route in FIG. 3) for the first DPD training process, and uses "the second transmitting circuit 350 and the second AFE circuit 380 of the second transceiver circuit" and "the first receiving circuit 340 of the first transceiver circuit" as the signal loop (i.e., the black transmission route in FIG. 3) for the second DPD training process. In comparison with the embodiment of FIG. 3, the prior art uses "the first transmitting circuit 330, the first AFE circuit 370, and the first receiving circuit 340 of the first transceiver circuit" as the signal loop for the first DPD training process, and uses "the second transmitting circuit 350, the second AFE circuit 380, and the second receiving circuit 360 of the second transceiver" as the signal loop for the second DPD training process. Accordingly, the DPD circuit of the prior art cannot be used as the DPD circuit 320 of the embodiment of FIG. 3, and it should be redesigned to cope with the signal loop of the embodiment of FIG. 3. Therefore, the design complexity (e.g., the configuration of logical circuits) of the DPD circuit 320 may increase, and additional cost may be necessary. To prevent the above-mentioned problem, embodiments of FIGS. 6~7 are provided.

Figure 6:
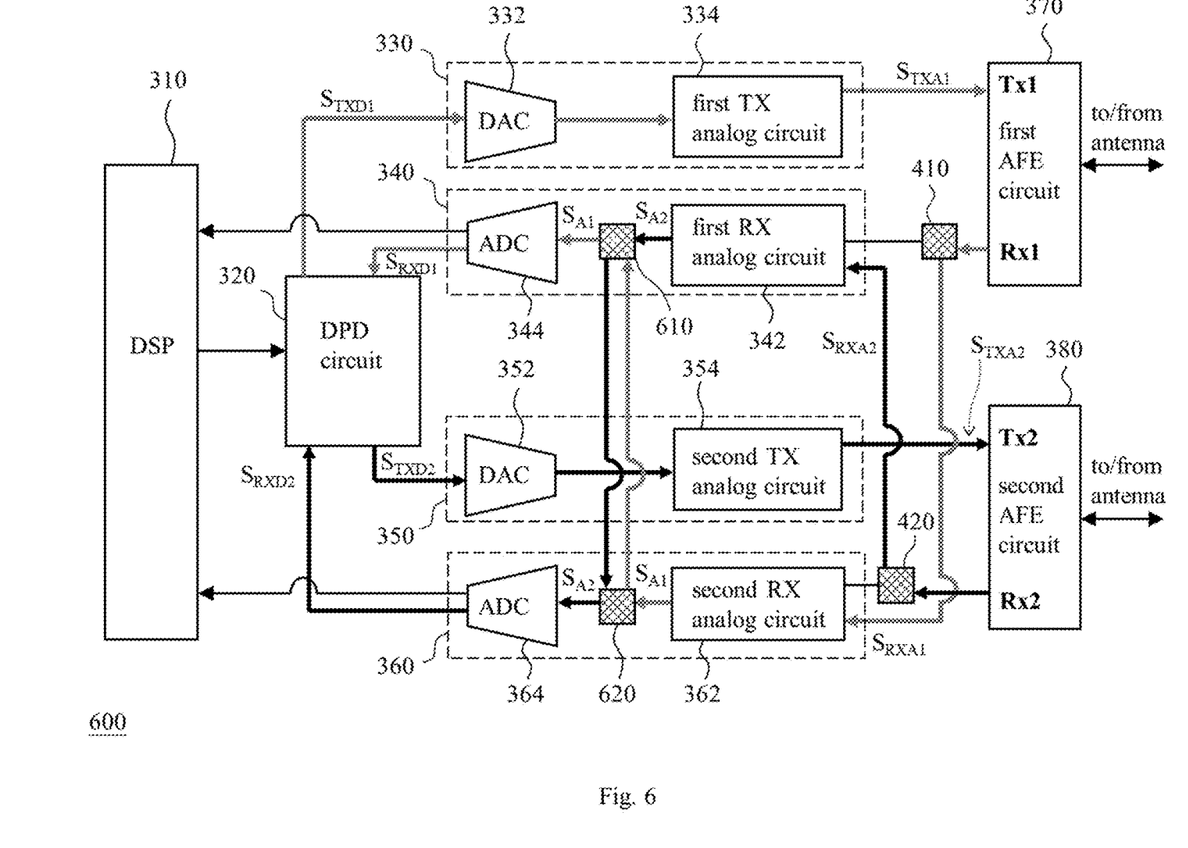
FIG. 6 shows another embodiment of the signal predistortion circuit configuration of the present disclosure.

FIG. 6 shows an embodiment of the signal predistortion circuit configuration of the present disclosure. The embodiment of FIG. 6 is applicable to a communication device and can take the place of the configuration of FIG. 4. In comparison with the configuration of FIG. 4, the signal predistortion circuit configuration 600 of FIG. 6 further includes a first RX switch circuit 610 and a second RX switch circuit 620. The first RX switch circuit 610 is coupled with the first RX analog circuit 342, the first ADC 344, and the second RX switch circuit 620. The first RX switch circuit 610 is configured to forward a second analog signal ($S_{A2}$) from the first RX analog circuit 342 to the second RX switch circuit 620 and forward a first analog signal ($S_{A1}$) from the second RX switch circuit 620 to the first ADC 344 in the training mode. The second RX switch circuit 620 is coupled with the second RX analog circuit 362, the second ADC 364, and the first RX switch circuit 610. The second RX switch circuit 620 is configured to forward the first analog signal ($S_{A1}$) from the second RX analog circuit 362 to the first RX switch circuit 610 and forward the second analog signal ($S_{A2}$) from the first RX switch circuit 610 to the second ADC 364 in the training mode. In light of the above, the DPD circuit 320 of FIG. 6 outputs the first digital transmission signal ($S_{TXD1}$) to the first transmitting circuit 330 of the first transceiver circuit and receives the first digital reception signal ($S_{RXD1}$) from the first receiving circuit 340 of the first transceiver circuit, and the DPD circuit 320 outputs the second digital transmission signal ($S_{TXD2}$) to the second transmitting circuit 350 of the second transceiver circuit and receives the second digital reception signal ($S_{RXD2}$) from the second receiving circuit 360 of the second transceiver circuit. Accordingly, the DPD circuit 320 is allowed to be a conventional DPD circuit.

Figure 7:
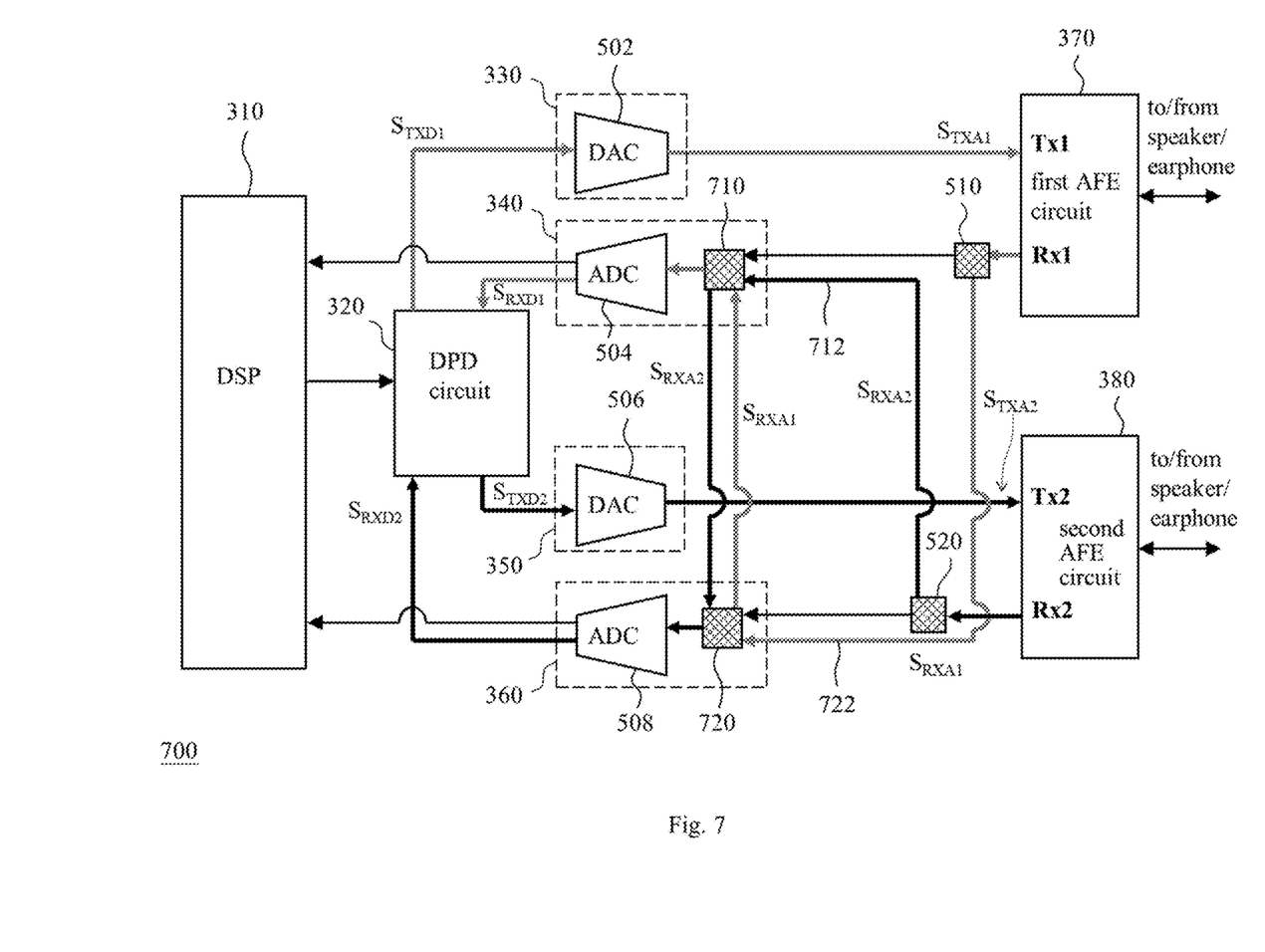
FIG. 7 shows yet another embodiment of the signal predistortion circuit configuration of the present disclosure.

FIG. 7 shows an embodiment of the signal predistortion circuit configuration of the present disclosure. The embodiment of FIG. 7 is applicable to an audio device and can take the place of the configuration of FIG. 5. In comparison with the configuration of FIG. 5, the signal predistortion circuit configuration 700 of FIG. 7 further includes a first RX switch circuit 710 and a second RX switch circuit 720. The first RX switch circuit 710 is coupled with the second mode switch circuit 520 via a first wiring 712 (e.g., transmission lines, traces, and so on) and coupled with the first ADC 504 and the second RX switch circuit 720. The first RX switch circuit 710 is configured to forward the second analog reception signal ($S_{RXA2}$) from the first wiring 712 to the second RX switch circuit 720 and forward the first analog reception signal ($S_{RXA1}$) from the second RX switch circuit 720 to the first ADC 504 in the training mode. The second RX switch circuit 720 is coupled with the first mode switch circuit 510 via a second wiring 722 (e.g., transmission lines, traces, and so on) and coupled with the second ADC 508 and the first RX switch circuit 710. The second RX switch circuit 720 is configured to forward the first analog reception signal ($S_{RXA1}$) from the second wiring 722 to the first RX switch circuit 710 and forward the second analog reception signal ($S_{RXA2}$) from the first RX switch circuit 710 to the second ADC 508 in the training mode. Based on the above-mentioned configuration, the DPD circuit 320 of FIG. 7 is allowed to be a conventional DPD circuit.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the signal predistortion circuit configuration of the present disclosure can increase the insulation between the transmission path and the reception path during a DPD training at a very low cost. Consequently, the result of the DPD training can be improved.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A signal predistortion circuit configuration comprising:
    a digital predistortion (DPD) circuit configured to output a first digital transmission signal according to at least one first predistortion parameter and output a second digital transmission signal according to at least one second predistortion parameter, and further configured to determine whether to adjust the at least one first predistortion parameter according to a first digital reception signal and determine whether to adjust the at least one second predistortion parameter according to a second digital reception signal;
    a first transceiver circuit including a first transmitting circuit, a first analog-front-end (AFE) circuit, a first receiving-end (RX) analog circuit, a first RX switch circuit, and a first analog-to-digital converter (ADC), wherein:
        the first transmitting circuit is coupled with the DPD circuit, and is configured to output a first analog transmission signal according to the first digital transmission signal;
        the first AFE circuit is coupled with the first transmitting circuit, and is configured to generate a first analog reception signal according to the first analog transmission signal;
        the first RX analog circuit is coupled with a second AFE circuit, and is configured to output a second analog signal to the first RX switch circuit according to a second analog reception signal;
        the first RX switch circuit is coupled with the first RX analog circuit, the first ADC, and a second RX switch circuit, and is configured to forward the second analog signal from the first RX analog circuit to the second RX switch circuit and forward a first analog signal from the second RX switch circuit to the first ADC; and
        the first ADC is coupled with the first RX switch circuit and the DPD circuit, and is configured to convert the first analog signal into the first digital reception signal for the DPD circuit; and
    a second transceiver circuit including a second transmitting circuit, the second AFE circuit, a second RX analog circuit, the second RX switch circuit, and a second ADC, wherein:
        the second transmitting circuit is coupled with the DPD circuit, and is configured to output a second analog transmission signal according to the second digital transmission signal;
        the second AFE circuit is coupled with the second transmitting circuit, and is configured to generate the second analog reception signal according to the second analog transmission signal;
        the second RX analog circuit is coupled with the first AFE circuit, and is configured to output the first analog signal to the second RX switch circuit according to the first analog reception signal;
        the second RX switch circuit is coupled with the second RX analog circuit, the second ADC, and the first RX switch circuit, and is configured to forward the first analog signal from the second RX analog circuit to the first RX switch circuit and forward the second analog signal from the first RX switch circuit to the second ADC; and
        the second ADC is coupled with the second RX switch circuit and the DPD circuit, and is configured to convert the second analog signal into the second digital reception signal for the DPD circuit,
    wherein a minimum distance between the first transmitting circuit and the first RX analog circuit is shorter than a minimum distance between the first transmitting circuit and the second RX analog circuit, and a minimum distance between the second transmitting circuit and the second RX analog circuit is shorter than a minimum distance between the second transmitting circuit and the first RX analog circuit.

2. The signal predistortion circuit configuration of claim 1, wherein the first transmitting circuit, the first RX analog circuit, the first ADC, the second transmitting circuit, the second RX analog circuit, and the second ADC are included in an integrated circuit; the first AFE circuit and the second AFE circuit are on a circuit board and outside the integrated circuit; and the first AFE circuit is coupled with the second RX analog circuit via a first trace of the circuit board, and the second AFE circuit is coupled with the first RX analog circuit via a second trace of the circuit board.

3. The signal predistortion circuit configuration of claim 1, wherein:
the first transmitting circuit includes:
a first digital-to-analog converter (DAC) configured to generate a first conversion signal according to the first digital transmission signal; and
a first transmitting-end (TX) analog circuit configured to generate the first analog transmission signal according to the first conversion signal; and
the second transmitting circuit includes:
a second DAC configured to generate a second conversion signal according to the second digital transmission signal; and
a second TX analog circuit configured to generate the second analog transmission signal according to the second conversion signal.

4. The signal predistortion circuit configuration of claim 3, wherein the signal predistortion circuit configuration is included in a wireless communication device; the first transmitting circuit includes a first radio-frequency (RF) transmitting circuit; the first AFE circuit is included in a first front-end modulator; the first RX analog circuit includes a first RF receiving circuit; the second transmitting circuit includes a second RF transmitting circuit; the second AFE circuit is included in a second front-end modulator; the second RX analog circuit includes a second RF receiving circuit; and the DPD circuit is included in a baseband circuit.

5. The signal predistortion circuit configuration of claim 4, further comprising:
a first mode switch circuit configured to couple the first AFE circuit with the second RX analog circuit in a training mode, and configured to couple the first AFE circuit with the first RX analog circuit in a communication mode;
a second mode switch circuit configured to couple the second AFE circuit with the first RX analog circuit in the training mode, and configured to couple the second AFE circuit with the second RX analog circuit in the communication mode; and
a digital signal processor (DSP) coupled with the first ADC and the second ADC,
wherein the DSP is configured to receive and process a first communication signal through the first AFE circuit, the first mode switch circuit, the first RX analog circuit, the first RX switch circuit, and the first ADC in the communication mode, and is configured to receive and process a second communication signal through the second AFE circuit, the second mode switch circuit, the second RX analog circuit, the second RX switch circuit, and the second ADC in the communication mode; and the first communication signal is originated from a first wireless communication partner, and the second communication signal is originated from the first wireless communication partner or a second wireless communication partner.

6. A signal predistortion circuit configuration comprising:
a digital predistortion (DPD) circuit configured to output a first digital transmission signal according to at least one first predistortion parameter and output a second digital transmission signal according to at least one second predistortion parameter, and further configured to determine whether to adjust the at least one first predistortion parameter according to a first digital reception signal and determine whether to adjust the at least one second predistortion parameter according to a second digital reception signal;
a first transceiver circuit including a first transmitting circuit, a first analog-front-end (AFE) circuit, a first wiring, a first receiving-end (RX) switch circuit, and a first analog-to-digital converter (ADC), wherein:
the first transmitting circuit is coupled with the DPD circuit, and is configured to output a first analog transmission signal according to the first digital transmission signal;
the first AFE circuit is coupled with the first transmitting circuit, and is configured to generate a first analog reception signal according to the first analog transmission signal;
the first wiring is coupled with a second AFE circuit, and is configured to transmit a second analog reception signal to the first RX switch circuit;
the first RX switch circuit is coupled with the first wiring, the first ADC, and a second RX switch circuit, and is configured to forward the second analog signal from the first wiring to the second RX switch circuit and forward the first analog reception signal from the second RX switch circuit to the first ADC; and
the first ADC is coupled with the first RX switch circuit and the DPD circuit, and is configured to convert the first analog reception signal into the first digital reception signal for the DPD circuit; and
a second transceiver circuit including a second transmitting circuit, a second AFE circuit, a second wiring, a second RX switch circuit, and a second ADC, wherein:
the second transmitting circuit is coupled with the DPD circuit, and is configured to output a second analog transmission signal according to the second digital transmission signal;
the second AFE circuit is coupled with the second transmitting circuit, and is configured to generate the second analog reception signal according to the second analog transmission signal;
the second wiring is coupled with the first AFE circuit, and is configured to transmit the first analog reception signal to the second RX switch circuit;
the second RX switch circuit is coupled with the second wiring, the second ADC, and the first RX switch circuit, and is configured to forward the first analog signal from the second wiring to the first RX switch circuit and forward the second analog reception signal from the first RX switch circuit to the second ADC; and
the second ADC is coupled with the second RX switch circuit and the DPD circuit, and is configured to convert the second analog reception signal into the second digital reception signal for the DPD circuit,
wherein a minimum distance between the first transmitting circuit and the first wiring is shorter than a minimum distance between the first transmitting circuit and the second wiring, and a minimum distance between the second transmitting circuit and the second wiring is shorter than a minimum distance between the second transmitting circuit and the first wiring.

7. The signal predistortion circuit configuration of claim 6, wherein the signal predistortion circuit configuration is included in an audio device; the first AFE circuit includes a first amplifier; and the second AFE circuit includes a second amplifier.

8. The signal predistortion circuit configuration of claim 7, further comprising:
  a first mode switch circuit configured to couple the first AFE circuit with the second wiring in a training mode, and configured to couple the first AFE circuit with the first RX switch circuit in a playback mode;
  a second mode switch circuit configured to couple the second AFE circuit with the first wiring in the training mode, and configured to couple the second AFE circuit with the second RX switch circuit in the playback mode; and
  a digital signal processor (DSP) coupled with the first ADC and the second ADC,
  wherein the DSP is configured to receive and process a first audio signal through the first AFE circuit, the first mode switch circuit, the first RX switch circuit, and the first ADC in the playback mode, and is configured to receive and process a second audio signal through the second AFE circuit, the second mode switch circuit, the second RX switch circuit, and the second ADC in the playback mode.

* * * * *